(12) United States Patent
Wu

(10) Patent No.: US 8,050,992 B2
(45) Date of Patent: Nov. 1, 2011

(54) SECURE CARD WITH STORED BIOMETRIC DATA AND METHOD FOR USING THE SECURE CARD

(76) Inventor: Ming-Yuan Wu, Taipei (TW)

( * ) Notice: Subject to any disclaimer, the term of this patent is extended or adjusted under 35 U.S.C. 154(b) by 267 days.

(21) Appl. No.: 11/746,669

(22) Filed: May 10, 2007

(65) Prior Publication Data

US 2008/0281740 A1    Nov. 13, 2008

(30) Foreign Application Priority Data

May 8, 2007   (TW) .............................. 96116239 A

(51) Int. Cl.
*G06Q 40/00* (2006.01)
(52) U.S. Cl. .............. 705/35; 705/44; 705/41; 705/317; 705/318; 235/380
(58) Field of Classification Search .................... 705/67, 705/35, 74, 44, 41, 317, 318; 235/380, 375, 235/382, 379, 487, 492; 382/115
See application file for complete search history.

(56) References Cited

U.S. PATENT DOCUMENTS

| | | | |
|---|---|---|---|
| 7,039,223 B2 * | 5/2006 | Wong ............................. | 382/124 |
| 7,264,152 B2 * | 9/2007 | Tsuei et al. .................... | 235/380 |
| 7,314,164 B2 * | 1/2008 | Bonalle et al. ................. | 235/380 |
| 7,431,207 B1 * | 10/2008 | Neemann et al. .............. | 235/380 |
| 7,607,583 B2 * | 10/2009 | Berardi et al. ................. | 235/380 |
| 2001/0048025 A1 * | 12/2001 | Shinn ............................. | 235/382 |
| 2002/0091646 A1 * | 7/2002 | Lake et al. ...................... | 705/67 |
| 2003/0179910 A1 * | 9/2003 | Wong ............................. | 382/115 |
| 2004/0034784 A1 * | 2/2004 | Fedronic et al. ............... | 713/186 |
| 2004/0172339 A1 * | 9/2004 | Snelgrove et al. .............. | 705/26 |
| 2004/0254894 A1 * | 12/2004 | Tsuei et al. ..................... | 705/74 |
| 2004/0260653 A1 * | 12/2004 | Tsuei et al. ..................... | 705/54 |
| 2005/0232471 A1 * | 10/2005 | Baer ............................... | 382/115 |
| 2008/0052244 A1 * | 2/2008 | Tsuei et al. ..................... | 705/74 |

OTHER PUBLICATIONS

Weis, Kenneth P. "Controlling the Threat to Computer Security" Jun. 1990, Management Review, V79, N6, p54(4).*
Strassberg, Dan "Biometrics: You Are Your Password. (Includes Related Article on Fingerprint Sensing)" May 7, 1998, EDN, V43, N10, p46(8).*

* cited by examiner

*Primary Examiner* — Kelly Campen
(74) *Attorney, Agent, or Firm* — Ming Chow; Sinorica, LLC

(57) ABSTRACT

A secure card comprising biometric data of an individual for identifying or confirming authority of the individual. Prior to issuing the secure card a cardholder's biometric data is stored in the secure cards memory. When the secure card is used the cardholder inputs biometric data. This input biometric data is then compared to the biometric data stored in the card. If the input biometric data matches the stored biometric data the identity of the cardholder is confirmed. The secure card also comprises a transparent input area to separate the cardholder from an identity verification machine.

11 Claims, 16 Drawing Sheets

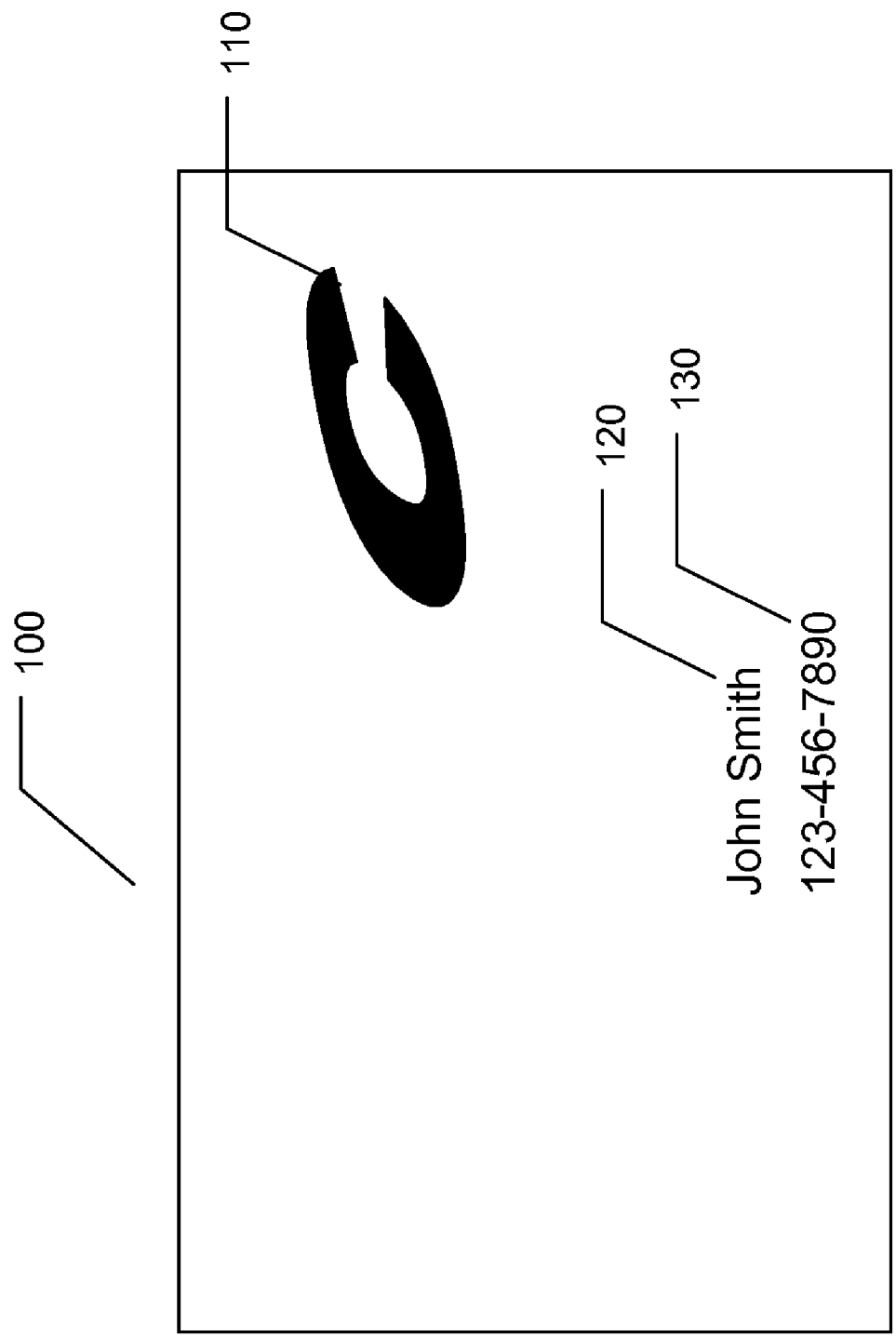
Figure 1A – Prior Art

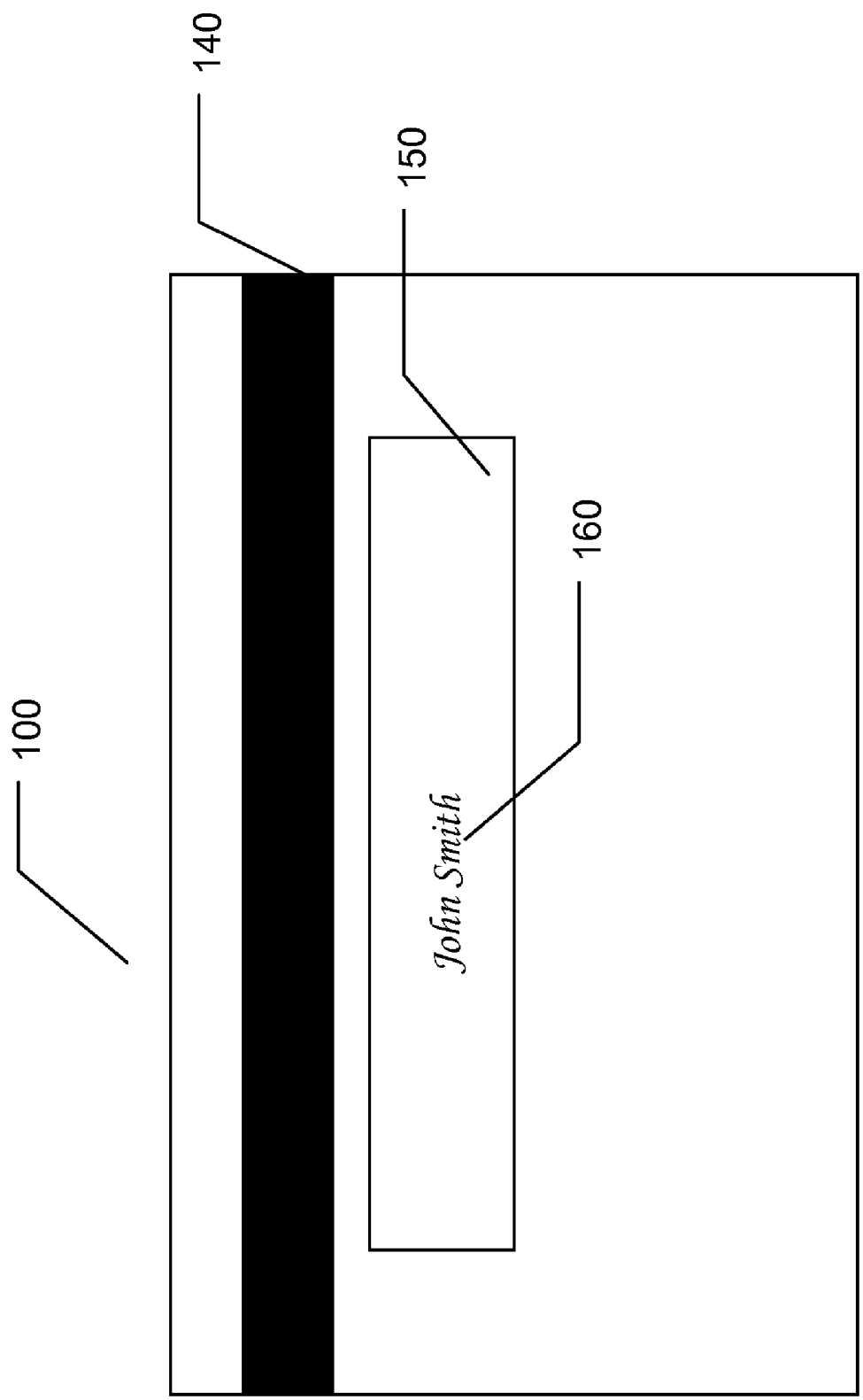
Figure 1B – Prior Art

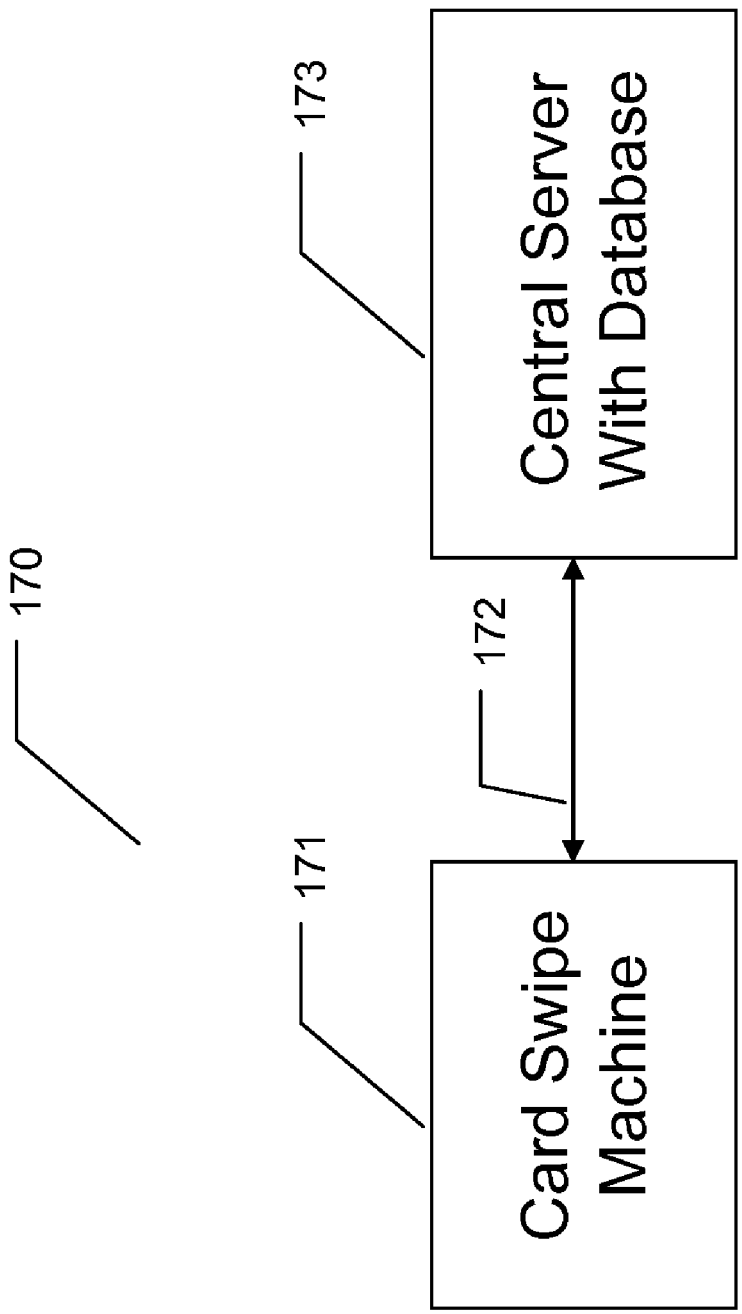
Figure 1C – Prior Art

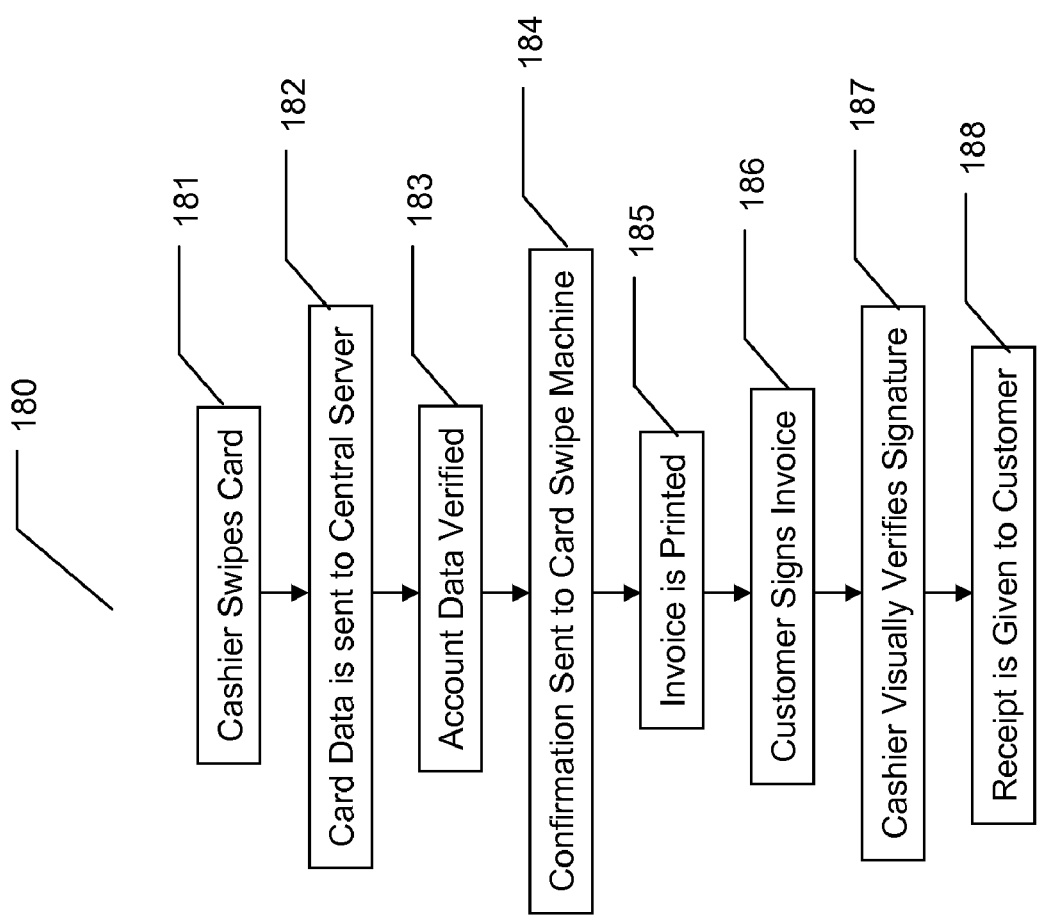
Figure 1D – Prior Art

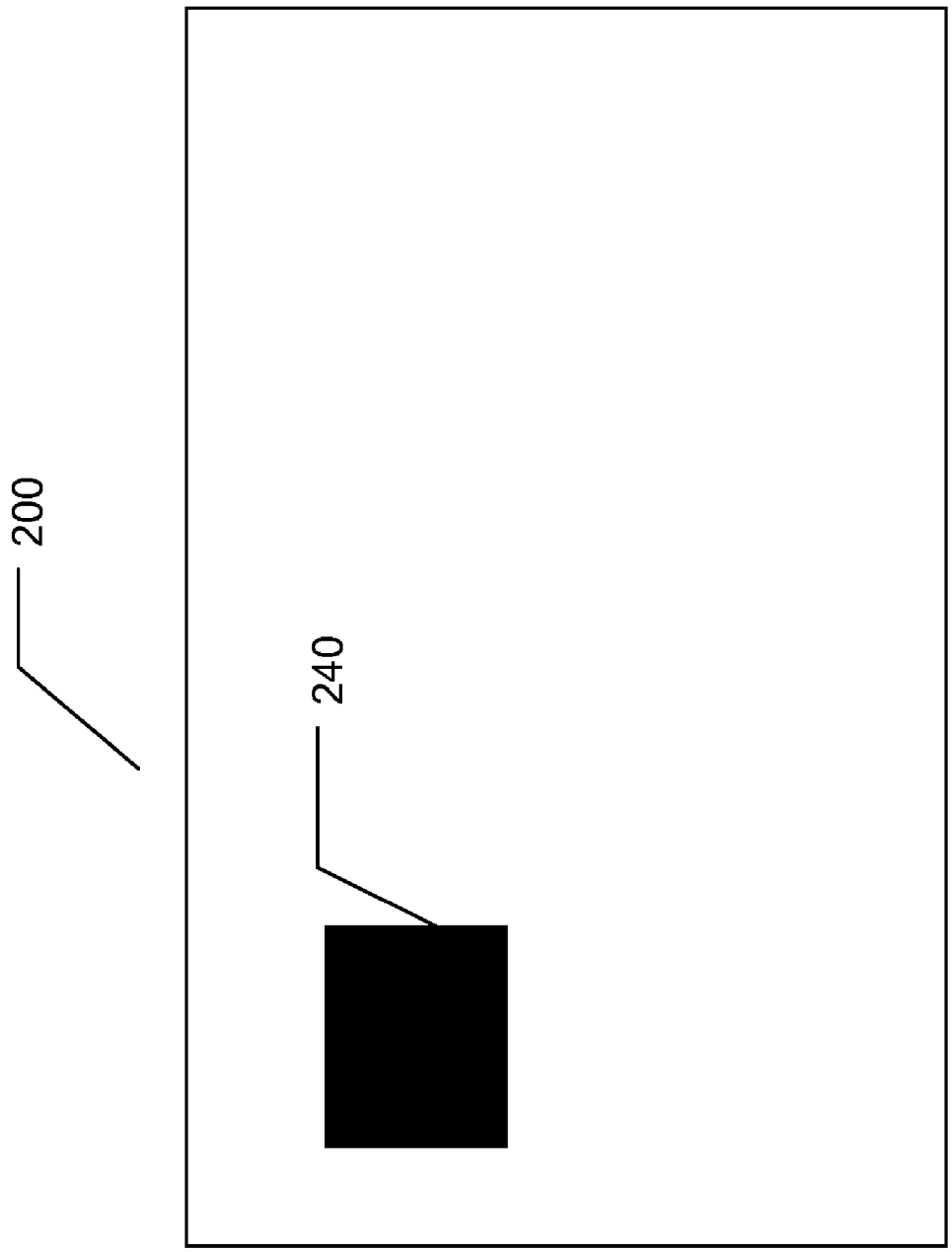

SECURE CARD WITH STORED BIOMETRIC DATA AND METHOD FOR USING THE SECURE CARD

BACKGROUND OF THE INVENTION

1. Field of the Invention

The present invention relates to identification cards and methods of secure cardholder identity confirmation. More specifically, the present invention discloses a secure card comprising stored biometric data that uniquely identifies the individual cardholder and a method for using the secure card.

2. Description of the Prior Art

Credit cards are widely used throughout the world to make purchasing products and service convenient. They allow a user to buy items without needing to carry currency.

However, credit card theft and fraud is rapidly becoming a major problem for credit card holders and the issuing financial institutions. If a credit card is stolen, the thief only needs to imitate the credit card holder's signature. This is fairly easy since the signature is prominently displayed on the rear side of the credit card. As a result thieves can easily use the card without the credit card holder's knowledge causing the holder to pay for items they didn't authorize. In some cases the financial institution that issued the card will take responsibility for the payment. However, both of these cases result in losses for either the card holder or the financial institution.

Refer to FIG. 1A, which is a drawing illustrating a front view of a conventional credit card of the prior art.

As shown in FIG. 1A, the front side of the conventional credit card 100 includes a logo 110 of the financial institution that issued the credit card 100. The card holder's name 120 and account number 130 are embossed in the lower part of the credit card 100.

Refer to FIG. 1B, which is a drawing illustrating a back view of a conventional credit card of the prior art.

The rear side of the conventional credit card 100 includes a magnetic strip 140 that contains account information that the financial institution stored in the magnetic strip 140 before giving the credit card 100 to the customer. Another vulnerability of the conventional credit card 100 is that it is possible for thieves to read or copy the data stored in the magnetic strip 140.

Also on the rear side of the conventional credit card 100 is a signature strip 150 where the card holder signs their signature 160. As mentioned above, the conventional credit card 100 provides a thief with an example of the credit card holder's signature 160. This allows the thief to practice imitating the signature until good enough to fool a cashier into accepting the card.

Refer to FIG. 1C, which is a drawing illustrating a conventional network for confirming a credit card of the prior art and to FIG. 1D, which is a flowchart illustrating a conventional method for using a credit card of the prior art.

The conventional method 180 and conventional system 170 for using a credit card include the customer giving the credit card to a cashier and the cashier swipes the credit card 181 through a card swipe machine 171. The card swipe machine 171 reads the account data stored in the magnetic strip on the credit card. The account data is then sent to a central server 173 having an account database 182 over a telephone line 172. The central server 173 then confirms the account has enough funds to cover the purchase 183 and a confirmation notice is sent to the card swipe machine 171, 184.

An invoice is printed 185 and the customer signs the invoice 186. The cashier then looks at the signature on the back of the credit card and compares it to the customer's signature 187. If the cashier feels that the signatures match, a copy of the invoice and a receipt are given to the customer 188. Since the cashier is using personal judgment to verify the signature mistakes are common.

Another disadvantage of the convention card and system is that data is stored on a central server. This opens the door to hackers to break into the server and steal the information.

Therefore, there is need for an improved means of confirming the identity and authority of an individual and prevents identity theft.

SUMMARY OF THE INVENTION

To achieve these and other advantages and in order to overcome the disadvantages of the conventional method in accordance with the purpose of the invention as embodied and broadly described herein, the present invention provides a secure card comprising a cardholder's biometric data that uniquely identifies or confirms authority of the cardholder.

The biometric data comprises, for example, fingerprint, iris or eye, handprint, facial, DNA data, or a combination of these.

Prior to issuing the secure card the card issuer obtains samples of biometric information from the user and stores the biometric data into a memory in or on the card. When the secure card is used, the biometric data stored in the card is compared with biometric data supplied by the user. For example, if the biometric data is a right index fingerprint, the user places their right index finger on a verification machine and the data are compared. In this way, even if the secure card is lost or stolen no one else can use the card since their biometric information will not match the cardholder's biometric information.

In an embodiment of the present invention the secure card is a credit card. When making a purchase the cardholder presents the secure card to the cashier handling the transaction. Biometric data is then supplied by the cardholder by scanning a particular or combination of particular body features that are unique to the cardholder. The cashier then recalls the biometric data from the secure card by, for example, scanning, swiping, or inserting the card in a card reader or verification machine. The device that reads the biometric data from the secure card or scans the cardholder's biometric data then compares the two data. If the data stored in the card matches the data supplied by the cardholder, the identity is confirmed.

An advantage of the present invention is that no data is sent across a network. Confirmation is made locally by the verification machine. This prevents identity theft or theft of the cardholder's data.

In another embodiment of the present invention the secure card is an identity card. The cardholder inserts the identity card into a verification machine and supplies their biometric information, for example, a fingerprint. The verification machine compares the biometric data stored in the identity card with the biometric data that the cardholder supplies. If the data are the same the verification machine confirms the cardholder's identity.

Another advantage of the present invention is that only the cardholder knows what biometric data to supply. Since there are a wide variety of possible biometric inputs the security is increased. Even if stolen a thief does not know which data to use.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 1A is a drawing illustrating a front view of a conventional credit card of the prior art;

FIG. 1B is a drawing illustrating a back view of a conventional credit card of the prior art;

FIG. 1C is a drawing illustrating a conventional network for confirming a credit card of the prior art;

FIG. 1D is a flowchart illustrating a conventional method for using a credit card of the prior art;

FIG. 2K is a drawing illustrating a front view of a secure card according to an embodiment of the present invention.

DESCRIPTION OF THE PREFERRED EMBODIMENTS

Figure 2A:
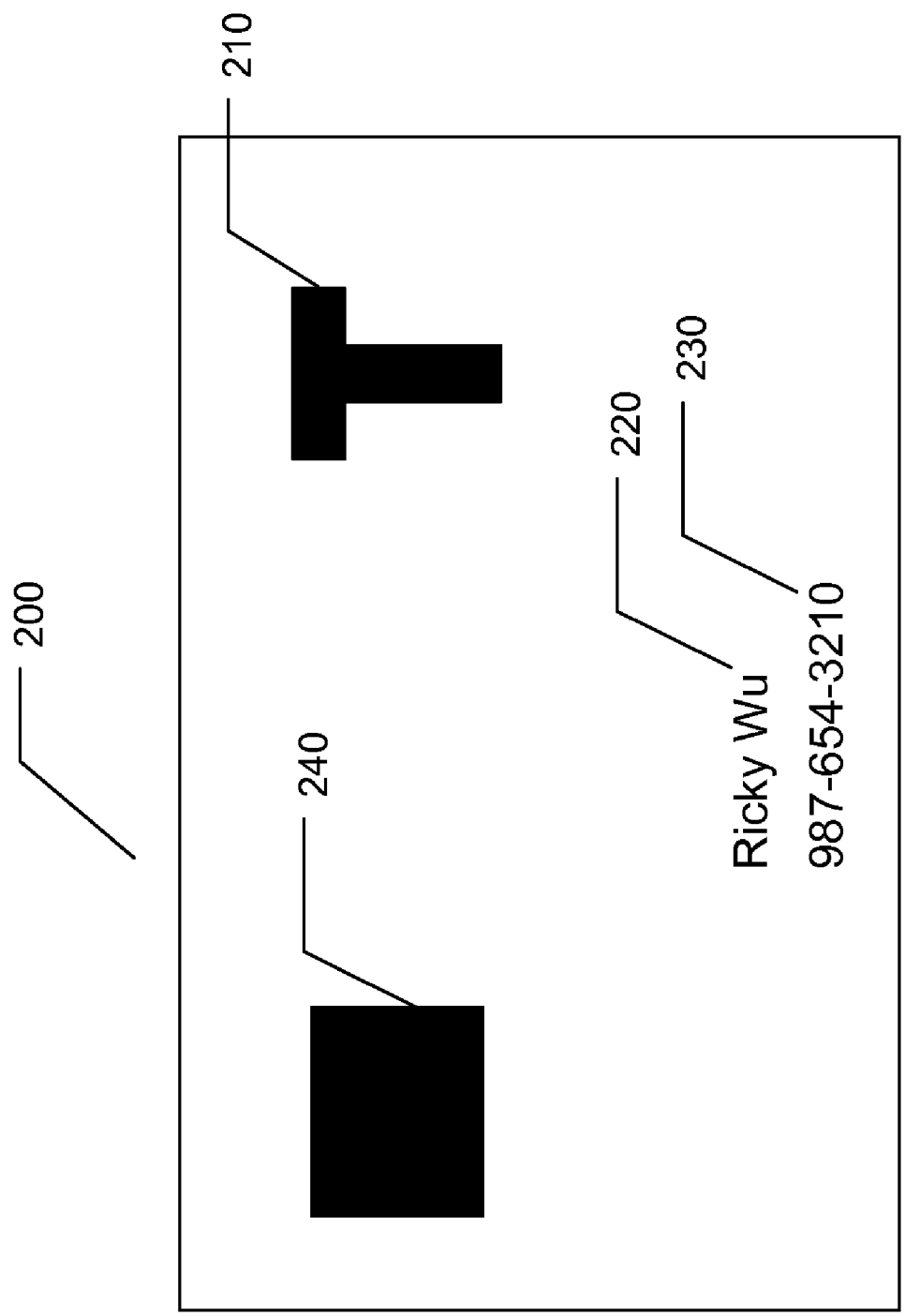
FIG. 2A is a drawing illustrating a front view of a secure card according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 2A, which is a drawing illustrating a front view of a secure card according to an embodiment of the present invention.

As shown in FIG. 2A the secure card 200 of the present invention comprises a logo 210 or name of the secure card issuer. The logo is, for example, the name of a financial institution or the name of a company. The front side of the secure card 200 also comprises the cardholder's name 220 and account number 230 or user number. A memory 240 is attached to or embedded in the secure card 200. When a user applies for the secure card 200 the user supplies certain samples or examples of biometric information. This biometric information uniquely identifies the user as no two individual have the same biometrics. The biometric information is stored in the memory 240 of the secure card 200. When the secure card 200 is used the cardholder supplies or inputs their biometric data and the input is compared with the biometric data stored in the memory 240. If the two match the identity of the cardholder is confirmed.

Figure 2B:
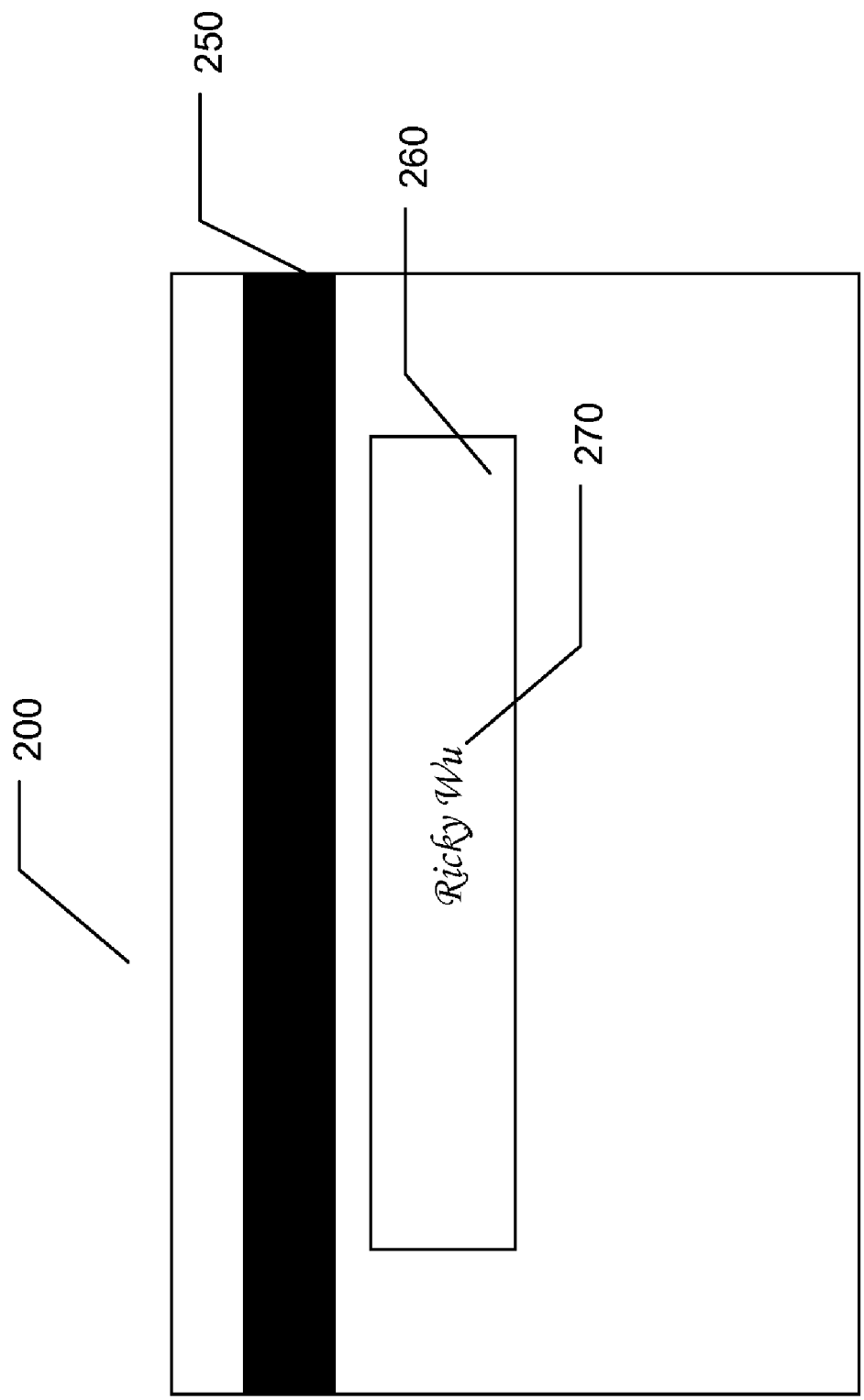
FIGS. 2B-2D are drawings illustrating rear views of a secure card according to an embodiment of the present invention.

Refer to FIG. 2B, which is a drawing illustrating a rear view of a secure card according to an embodiment of the present invention.

In an embodiment of the present invention as shown in FIG. 2B the back side of the secure card 200 comprises a magnetic strip 250 and a signature area 260. Information is stored in the magnetic strip 250. This information is read when the secure card is used. The signature area 260 allows a user to sign their name 270.

The cardholder information comprising account information, account number, personal identification number, employee number, security level, rank, financial institution identification, card number, card issuer identification, company name, or a combination of these.

Figure 2C:
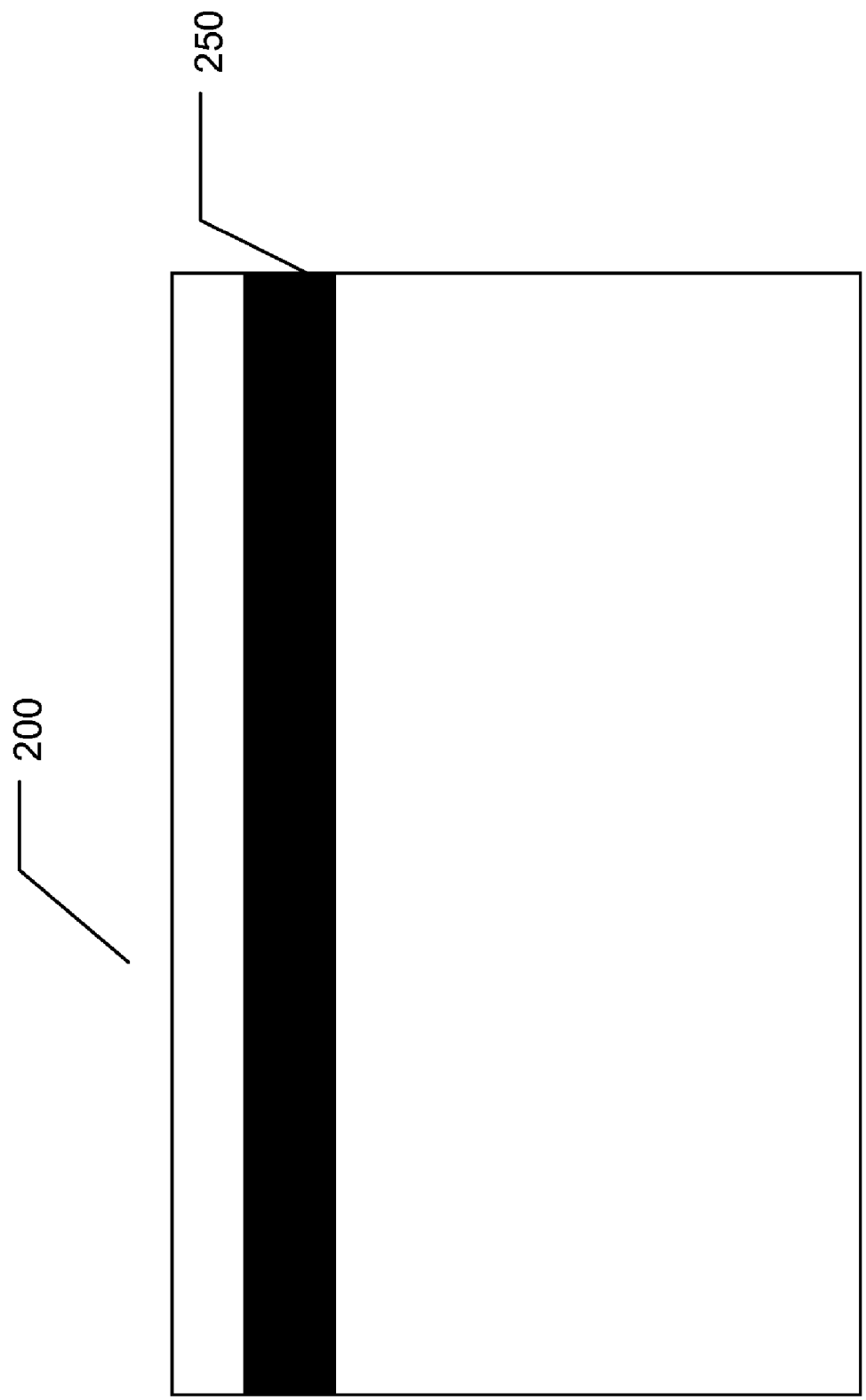

Refer to FIG. 2C, which is a drawing illustrating a rear view of a secure card according to an embodiment of the present invention.

In another embodiment, the signature area isn't present. This increases security as the cardholder's signature isn't visible. In this embodiment when the secure card is used the signature of the cardholder is compared with signature data in the memory of the secure card. This process is considerably more accurate that relying on a cashier to visually compare the signatures.

In another embodiment where the signature area isn't present, when the secure card is used no signature is required. Since biometrics are far more complex and impossible to duplicate, comparing the biometric data in the card memory with a user's supplied biometric data provides sufficient security.

Figure 2D:
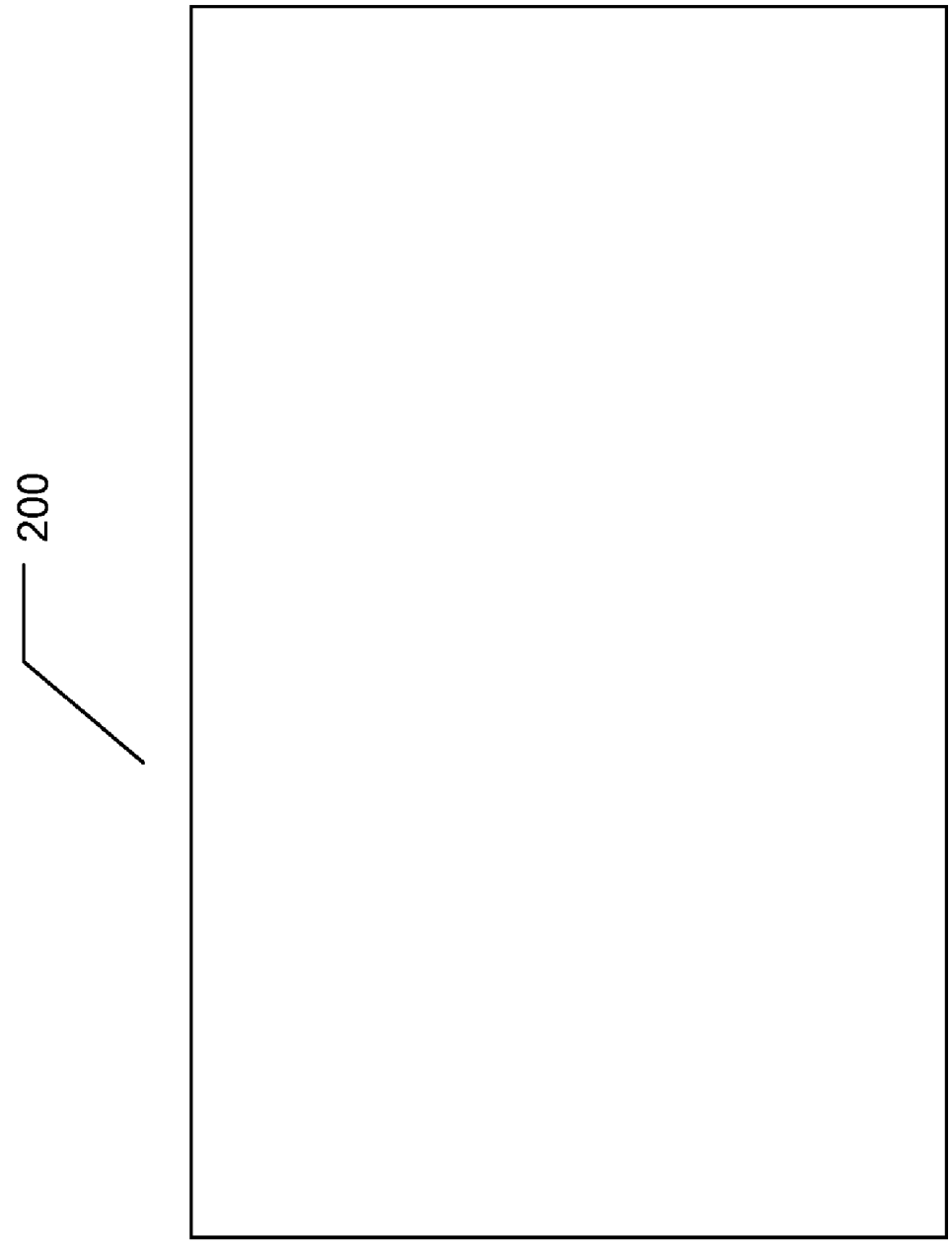

Refer to FIG. 2D, which is a drawing illustrating a rear view of a secure card according to an embodiment of the present invention.

In the embodiment illustrated in FIG. 2D, both the magnetic strip and the signature area are not present. In this embodiment the information that would normally be stored in the magnetic strip is stored in the secure card's memory along with the biometric data. This further increases security for the information as the information cannot be read without confirmation of the biometric data. In contrast, information stored in a magnetic strip can be read by a card swipe machine without requiring input by a cardholder.

Figure 2E:
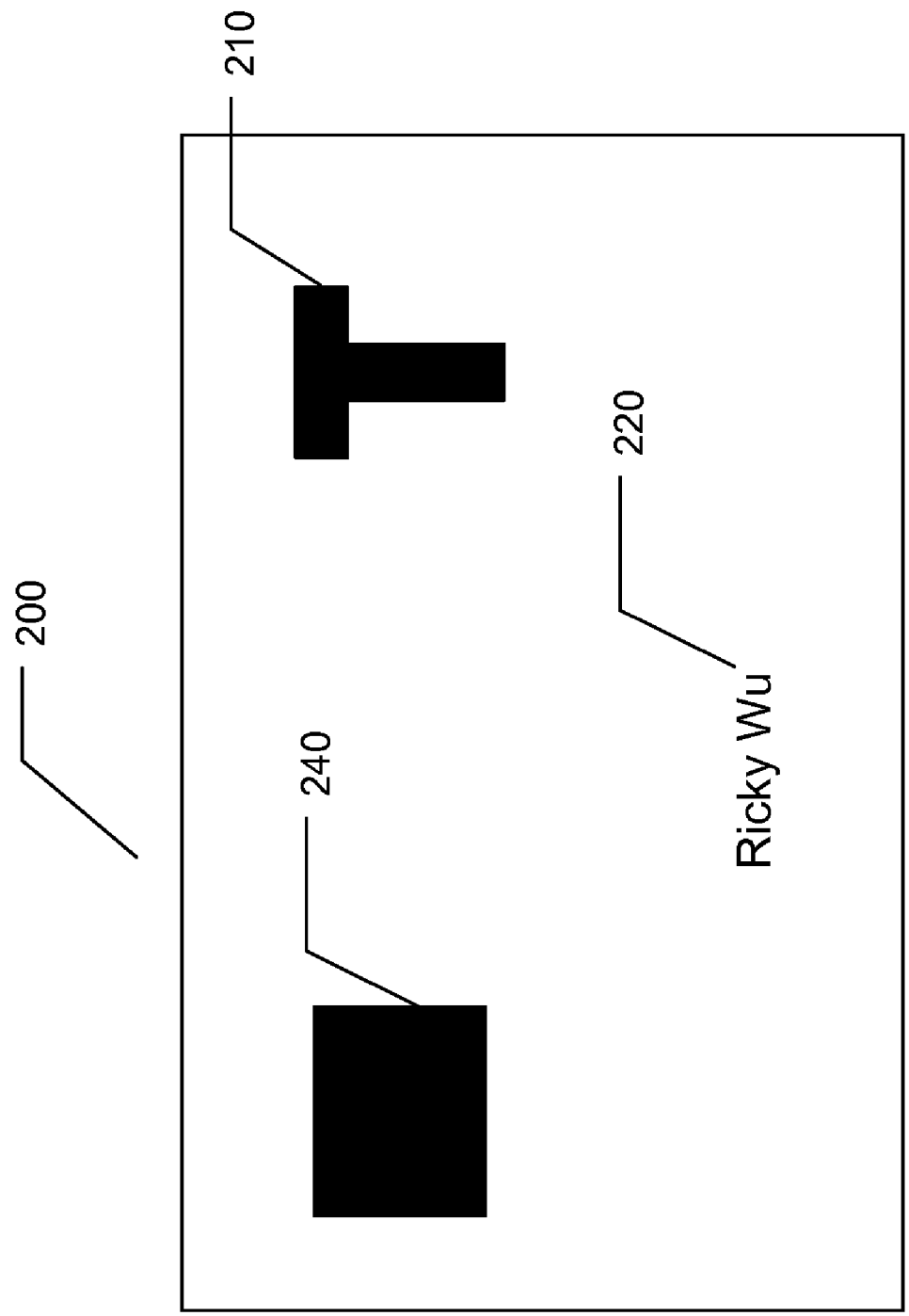
FIGS. 2E-2F are drawings illustrating front views of a secure card according to an embodiment of the present invention.

Refer to FIG. 2E, which is a drawing illustrating a front view of a secure card according to an embodiment of the present invention.

In another embodiment of the present invention the front side of the secure card 200 comprises the logo 210, the cardholder's name 220, and the memory 240 with the cardholder's stored biometric data. In this embodiment the secure card 200 doesn't display the cardholder's account number or identification number.

Figure 2F:
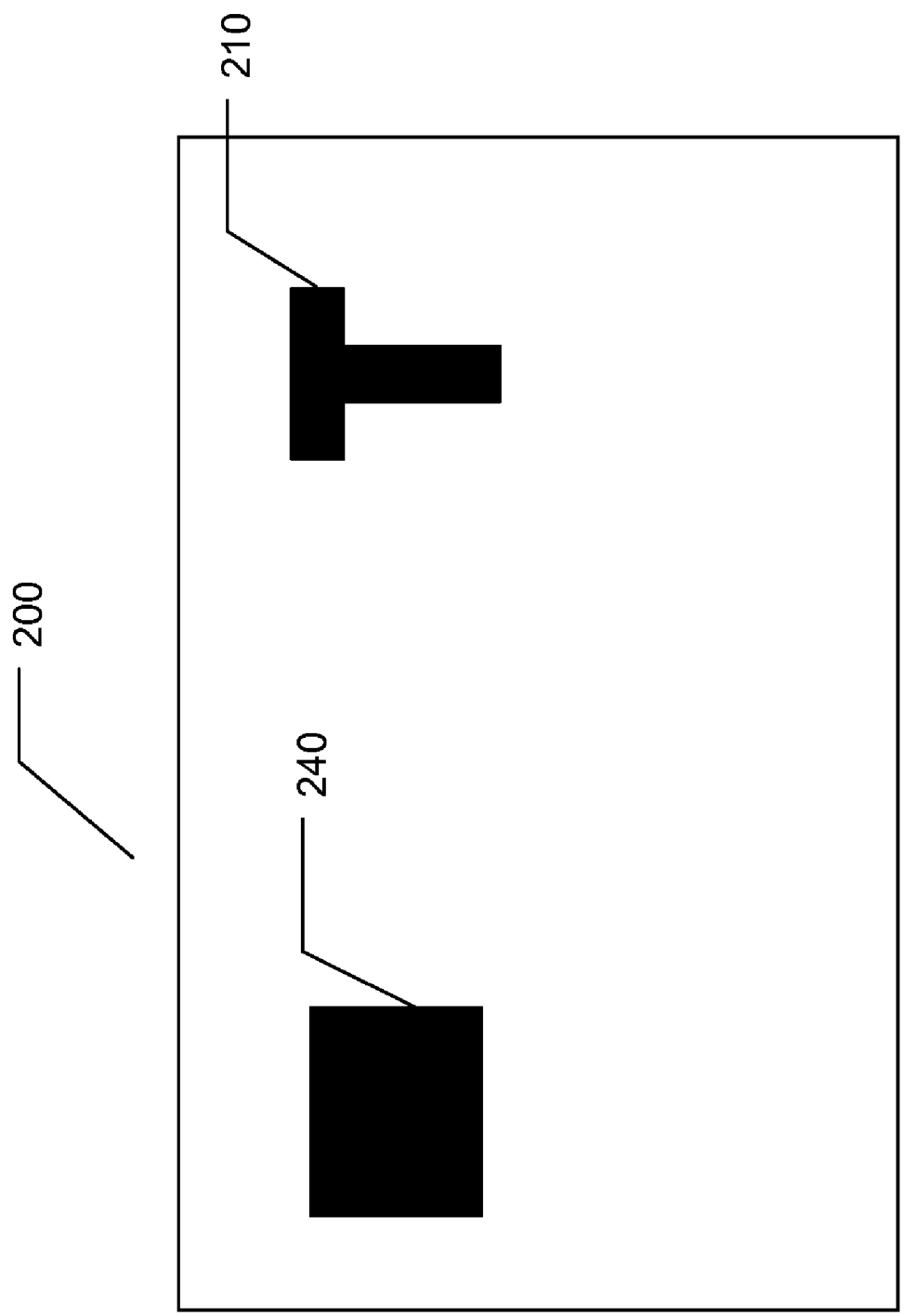

Refer to FIG. 2F, which is a drawing illustrating a front view of a secure card according to an embodiment of the present invention.

In the embodiment illustrated in FIG. 2F, the cardholder's name and account number are not displayed on the secure card 200. This further increases security as no one else but the cardholder knows who the secure card belongs to.

Figure 2G:
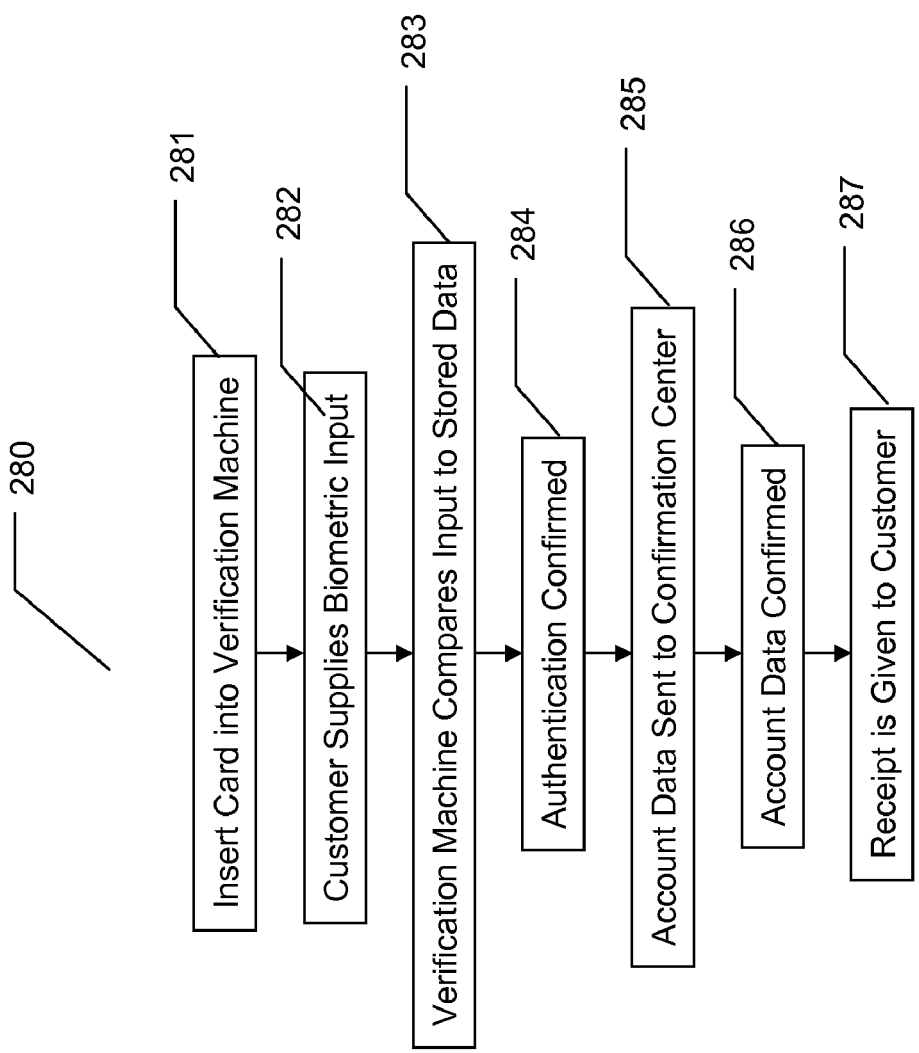
FIGS. 2G-2H are flowcharts illustrating methods of using a secure card according to an embodiment of the present invention.

Refer to FIG. 2G, which is a flowchart illustrating a method of using a secure card according to an embodiment of the present invention.

As shown in FIG. 2G, a method of using a secure card 280 comprises inserting the secure card into a verification machine in Step 281. The cardholder then supplies their biometric input in Step 282. In Step 283 the verification machine compares the biometric input with biometric data stored in the secure card. If the data matches, the verification machine confirms the cardholder's identity in Step 184. Once the cardholder's identity is verified, account information is sent to an account confirmation center in Step 285 and the confirmation center determines if there are adequate funds in the account. The confirmation center sends a confirmation to the verification machine in Step 286 and a receipt is given to the cardholder in Step 287.

In this embodiment the cardholder's account information is not sent until the cardholder's identity has been confirmed. This provides superior security over the conventional method where the account information is sent to the central server before the user's identity is confirmed by their signature.

Figure 2H:
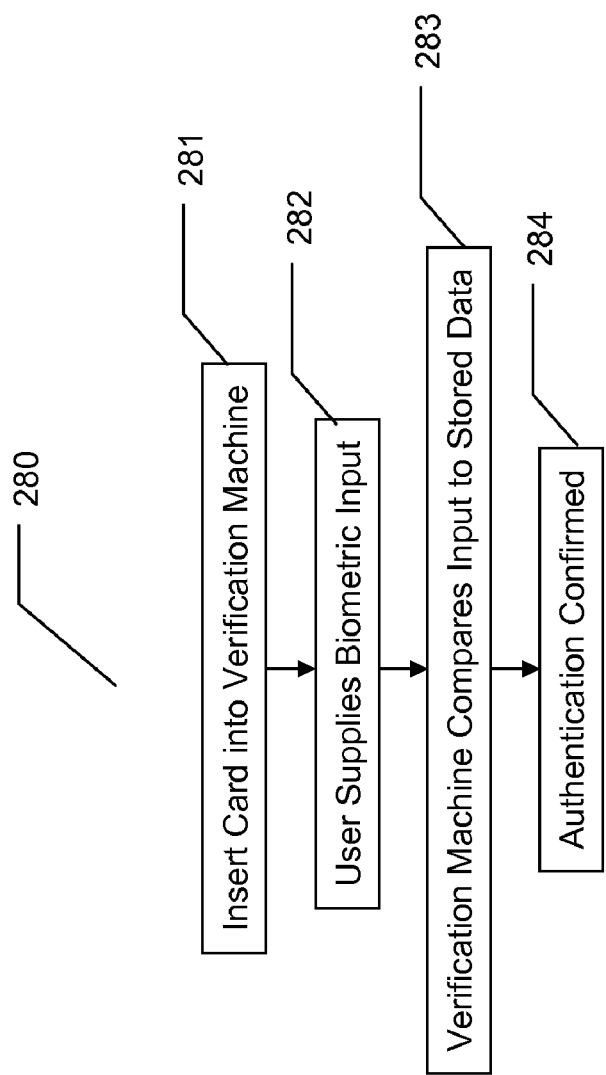

Refer to FIG. 2H, which is a flowchart illustrating a method of using a secure card according to an embodiment of the present invention.

As shown in FIG. 2H, a method of using a secure card 280 comprises inserting the secure card into a verification machine in Step 281. The cardholder then supplies their biometric input in Step 282. In Step 283 the verification machine compares the biometric input with biometric data stored in the secure card. If the data matches, the verification machine confirms the cardholder's identity in Step 184. In this embodiment no information is sent across a network and the verification procedure is performed locally by the verification machine. This provides optimal security for the cardholder. Since none of the cardholder's data is stored on a network or server the cardholder's data cannot be stolen or misused.

Figure 2I:
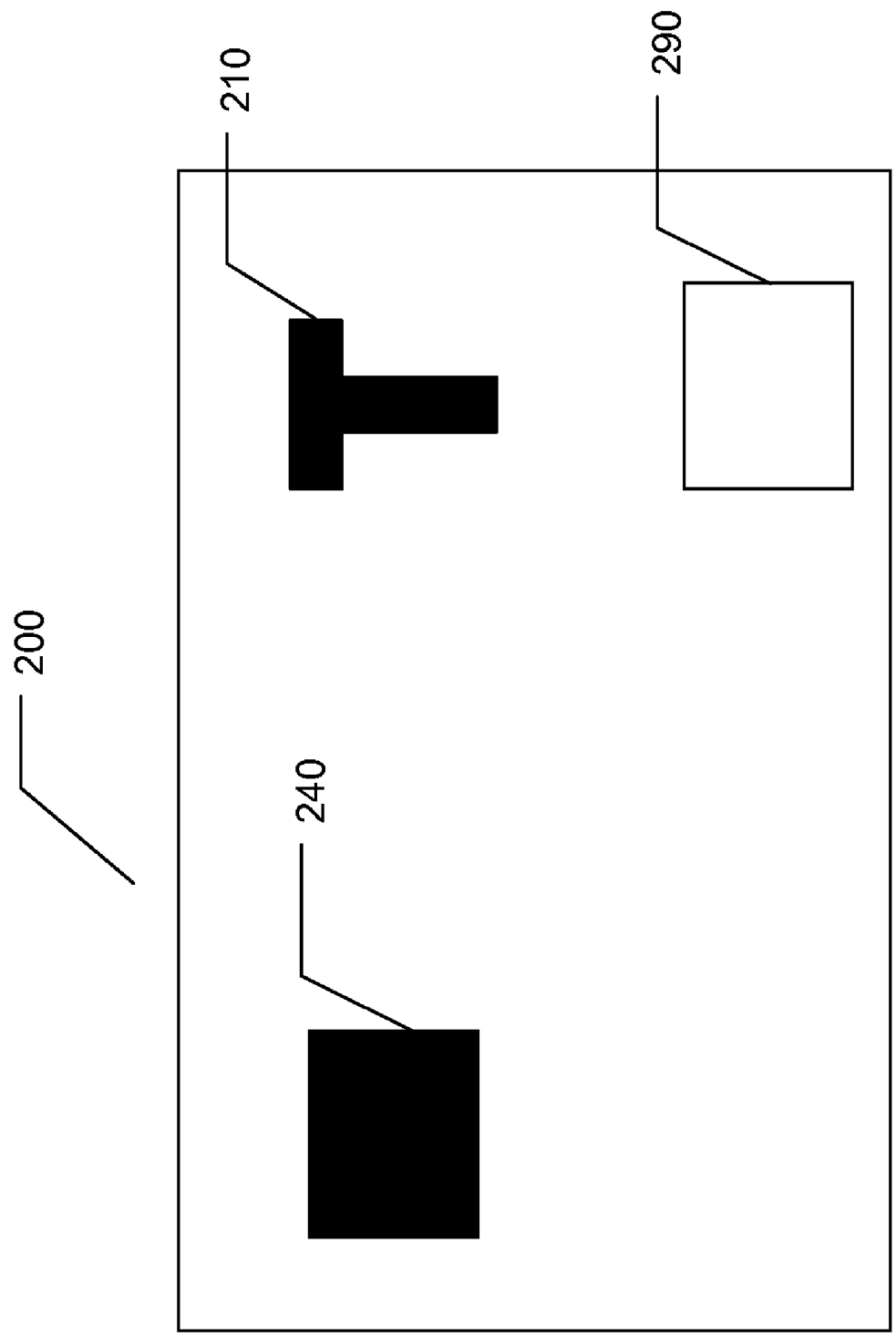
FIGS. 2I-2J are drawings illustrating front views of a secure card according to an embodiment of the present invention.

Refer to FIG. 2I, which is a drawing illustrating a front view of a secure card according to an embodiment of the present invention.

In the embodiment illustrated in FIG. 2I, the secure card 200 comprises a logo 210, a memory 240, and a transparent input area 290 where a cardholder inputs their biometric data. For example, after the secure card is inserted into the verification machine the cardholder presses a finger onto the transparent input area 290. The verification machine scans the fingerprint and compares it to fingerprint data stored in the memory 240 of the secure card 200.

In this embodiment since the finger doesn't contact the verification machine directly, the fingerprint cannot be transferred. For example, if the surface of the verification machine is glass and the cardholder presses their finger to the glass for scanning it is possible that a residual fingerprint is left on the glass. Although difficult it is possible for a thief to obtain a copy of the fingerprint from the glass. However, in this embodiment the cardholder presses their fingerprint to the transparent input area 290 which is between the cardholder's finger and the surface of the verification machine. If the fingerprint is transferred it is left on the transparent input area 290 and not the verification machine. The transparent input area 290 can easily be wiped clean to remove traces of the fingerprint.

Figure 2J:
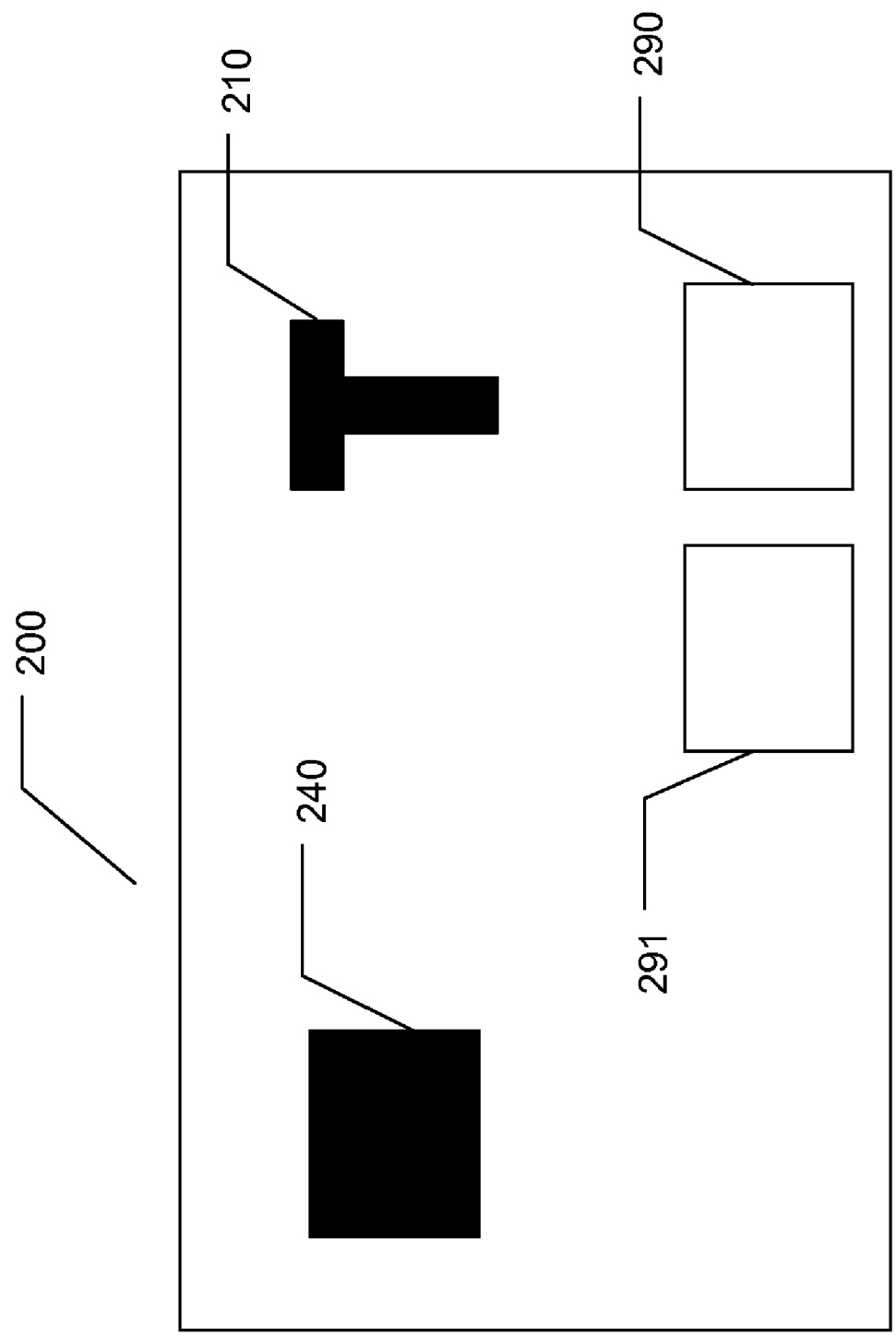

Refer to FIG. 2J, which is a drawing illustrating a front view of a secure card according to an embodiment of the present invention.

In embodiments of the present invention the secure card 200 comprises a plurality of transparent input areas. In the embodiment illustrated in FIG. 2J, the secure card 200 comprises a first transparent input area 290 and a second transparent input are 291. This allows two pieces of biometric data to be input at a time. Since a plurality of separate biometric inputs is required, security is increased. In other embodiments of the present invention the secure card comprises more than two transparent input areas. For example, the secure card comprises four transparent input areas so that the four fingerprints of one hand are input at the same time or eight transparent input areas so that the four fingerprints of both hands are input at the same time.

Refer to FIG. 2K, which is a drawing illustrating a front view of a secure card according to an embodiment of the present invention.

In this embodiment no information is displayed on the secure card 200. The secure card 200 only comprises a memory 240 in which the cardholder's biometric data is stored. This embodiment provides ultimate security since the cardholder's signature, name, account number are not shown on the card. If the card is stolen the thief doesn't know who the card belongs to so the card is useless to the thief. Additionally, the logo of the card issuer or company is not displayed so no one knows how the card can be used. Since no information is visible on the card no one knows how or where the secure card can be used except the cardholder.

In an embodiment of the present invention a personal identification number or password is stored in the secure card's memory. Along with biometric data the cardholder inputs an identification number or password in order to complete the confirmation process.

Figure 3:
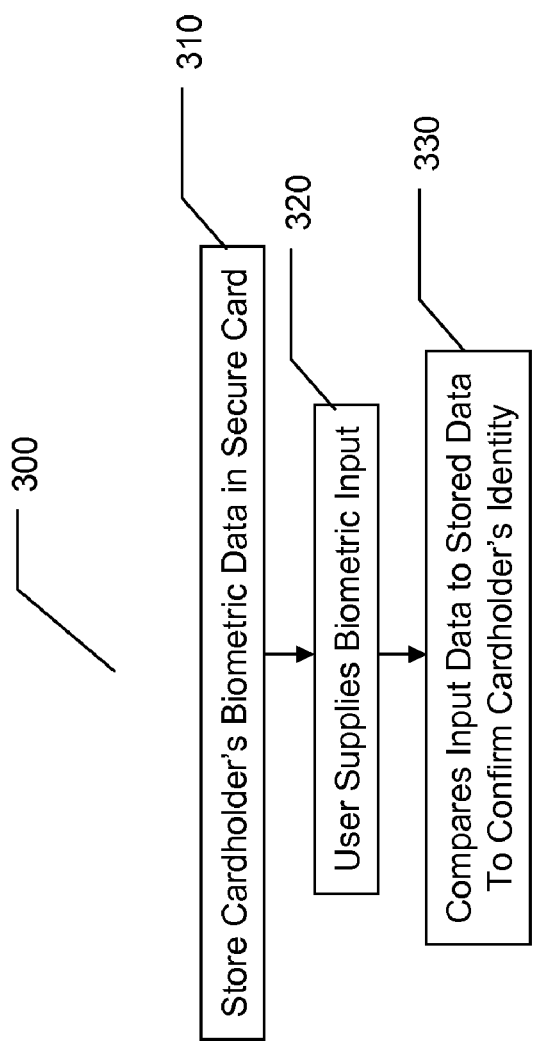
FIG. 3 is a flowchart illustrating a method of using a secure credit card according to an embodiment of the present invention.

Refer to FIG. 3, which is a flowchart illustrating a method for using a secure card to identify a cardholder according to an embodiment of the present invention.

The method 300 begins by storing biometric data of a cardholder in a secure card in Step 310. Next in Step 320, when the card is used biometric data is input by the cardholder and the input biometric data is compared with the stored biometric data to confirm the identity of the cardholder in Step 330. If the data match the cardholder's identity is confirmed.

In embodiments of the present invention a plurality of biometric inputs is required. For example, a fingerprint and iris are scanned and compared with biometric data stored in the card.

In another embodiment of the present invention biometric data are input sequentially. For example, first a right hand index fingerprint is input, then a left middle fingerprint, and then a right thumbprint. In this embodiment the sequence of the inputs increases the complexity required to try to misuse the secure card. Only the cardholder knows which sequence to follow.

In embodiments of the present invention the secure card comprises a credit card, identification card, a driver's license, an entrance keycard, an employee badge, a passport, a medical insurance card, an automatic teller machine card, a bank card, a debit card, a transit card, a public transportation card, a national identification card, or a membership card.

As described above, the present invention provides a secure card with a cardholder's biometric data. When the secure card is used the cardholder provides a biometric input. This input is then compared with the data stored in the secure card. If they match, the cardholder's identity is confirmed. In this way, only the cardholder can use the secure card. Even if the card is stolen, a thief is not able to use it. Additionally, only the cardholder knows what biometric input is needed.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method for using a secure card to identify a cardholder comprising;

receiving biometric data input by the cardholder by a verification machine; reading biometric data stored in the secure card by the verification machine, the secure card comprising a memory for storing biometric data, the biometric data uniquely identifying the cardholder and a transparent input area on the secure card for separating the cardholder from the verification machine, the transparent input area allowing the verification machine to receive the biometric data input by the cardholder through the transparent input area, and the transparent input area preventing the cardholder from directly touching the verification machine; and comparing, by the verification machine, input biometric data with biometric data stored in the secure card, by the verification machine, to confirm identity of the cardholder;

wherein neither the input biometric data nor the biometric data stored in the secure card is stored in the verification machine after the confirming process is complete.

2. The method for using a secure card to identify a cardholder of claim 1, further comprising storing the cardholder's biometric data in the secure card by a card writer machine before issuing the secure card to the cardholder.

3. The method for using a secure card to identify a cardholder of claim 1, the secure card comprising a credit card, identification card, a driver's license, an entrance keycard, an employee badge, a passport, a medical insurance card, an automatic teller machine card, a bank card, a debit card, a transit card, a public transportation card, a national identification card, or a membership card.

4. The method for using a secure card to identify a cardholder of claim 1, the biometric data comprising fingerprint, iris or eye, handprint, facial, DNA data, or a combination of fingerprints, irises or eyes, handprints, facials, or DNA data or a combination of fingerprints, irises or eyes, handprints, facials, or DNA data to be input in a predetermined sequence, the predetermined sequence determined by the cardholder;

wherein only if the biometric data is input in an order matching the predetermined sequence, is identity of the cardholder confirmed.

5. The method for using a secure card to confirm identity of a cardholder of claim 1, further comprising sending account information to a financial institution server to confirm account balance or credit line is sufficient to cover payment of a purchase after the identity of the cardholder is confirmed by the verification machine.

6. A method for using a secure card to confirm identity of a cardholder comprising:

storing biometric data of the cardholder in a secure card by a card writer machine;

reading biometric data input by the cardholder by a verification machine, the verification machine reading the biometric data input by the cardholder through a transparent input area on the secure card, and the biometric data input in a predetermined sequence determined by the cardholder;

reading, by the verification machine, biometric data stored in the secure card, by the verification machine;

comparing, by the verification machine, input biometric data with biometric data stored in the secure card, by the verification machine; and verifying input biometric data was input in the predetermined sequence, by the verification machine, to confirm the identity of the cardholder;

wherein only if the biometric data is input in an order matching the predetermined sequence, is identity of the cardholder confirmed; and wherein neither the input biometric data nor the biometric data stored in the secure card is permanently stored in the verification machine.

7. The method for using a secure card to confirm identity of a cardholder of claim 6, further comprising inserting the secure card into the verification machine prior to reading.

8. The method for using a secure card to confirm identity of a cardholder of claim 7, where the verification machine reads the biometric data and compares the input biometric data with the stored biometric data and erases all read data after confirmation.

9. The method for using a secure card to identify a cardholder of claim 6, the secure card comprising a credit card, identification card, a driver's license, an entrance keycard, an employee badge, a passport, a medical insurance card, an automatic teller machine card, a bank card, a debit card, a transit card, a public transportation card, a national identification card, or a membership card.

10. The method for using a secure card to identify a cardholder of claim 6, the biometric data comprising fingerprint, iris or eye, handprint, facial, DNA data, or a combination of fingerprints, irises or eyes, handprints, facials, or DNA data.

11. The method for using a secure card to confirm identity of a cardholder of claim 6, further comprising sending account information to a financial institution server to confirm account balance or credit line is sufficient to cover payment of a purchase after the identity of the cardholder is confirmed by the verification machine.

* * * * *